Figure 6:
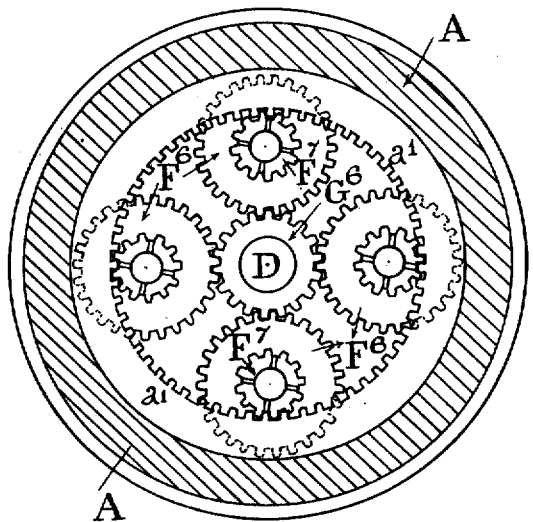

F. MOLYNEUX.
VARIABLE SPEED TRANSMISSION GEAR.
APPLICATION FILED AUG. 6, 1917.
1,353,775.
Patented Sept. 21, 1920.
4 SHEETS—SHEET 1.
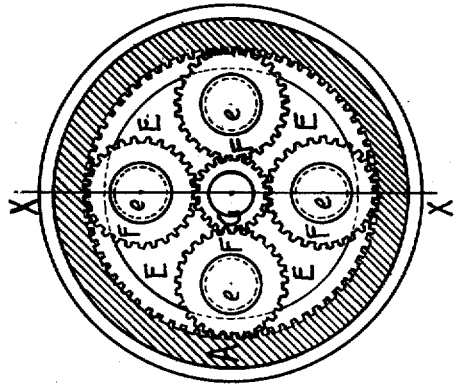
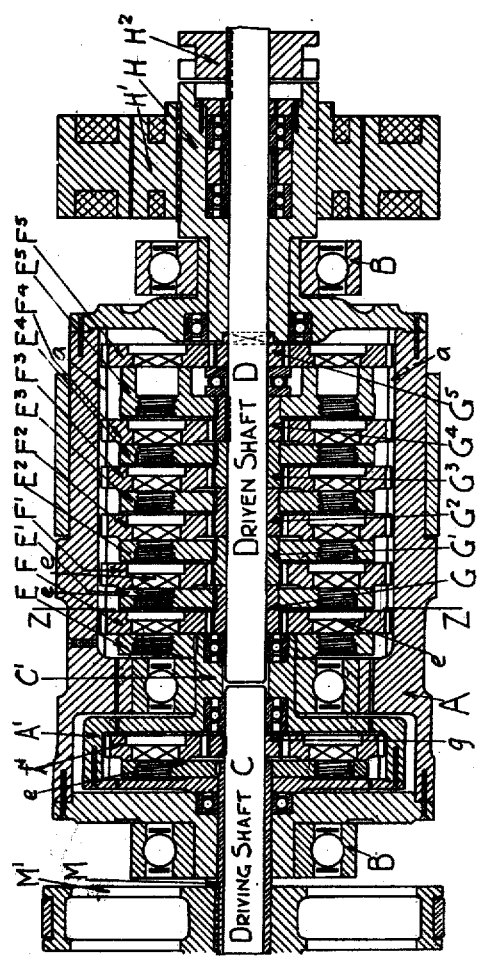
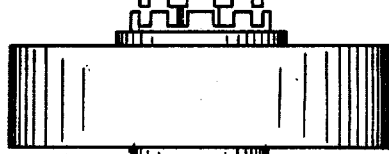
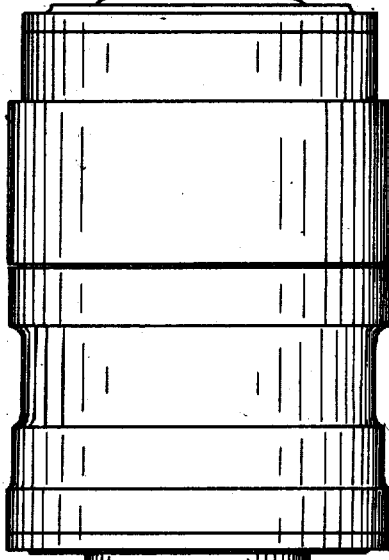

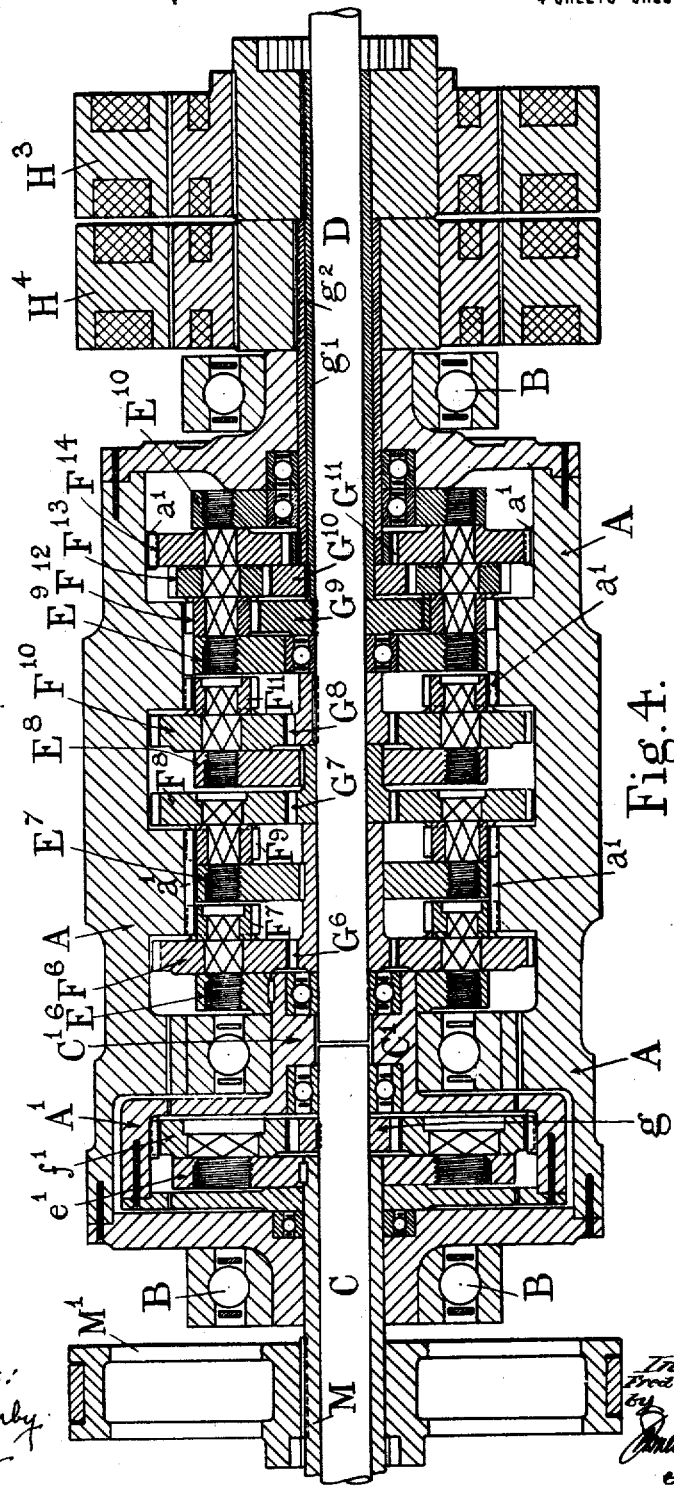

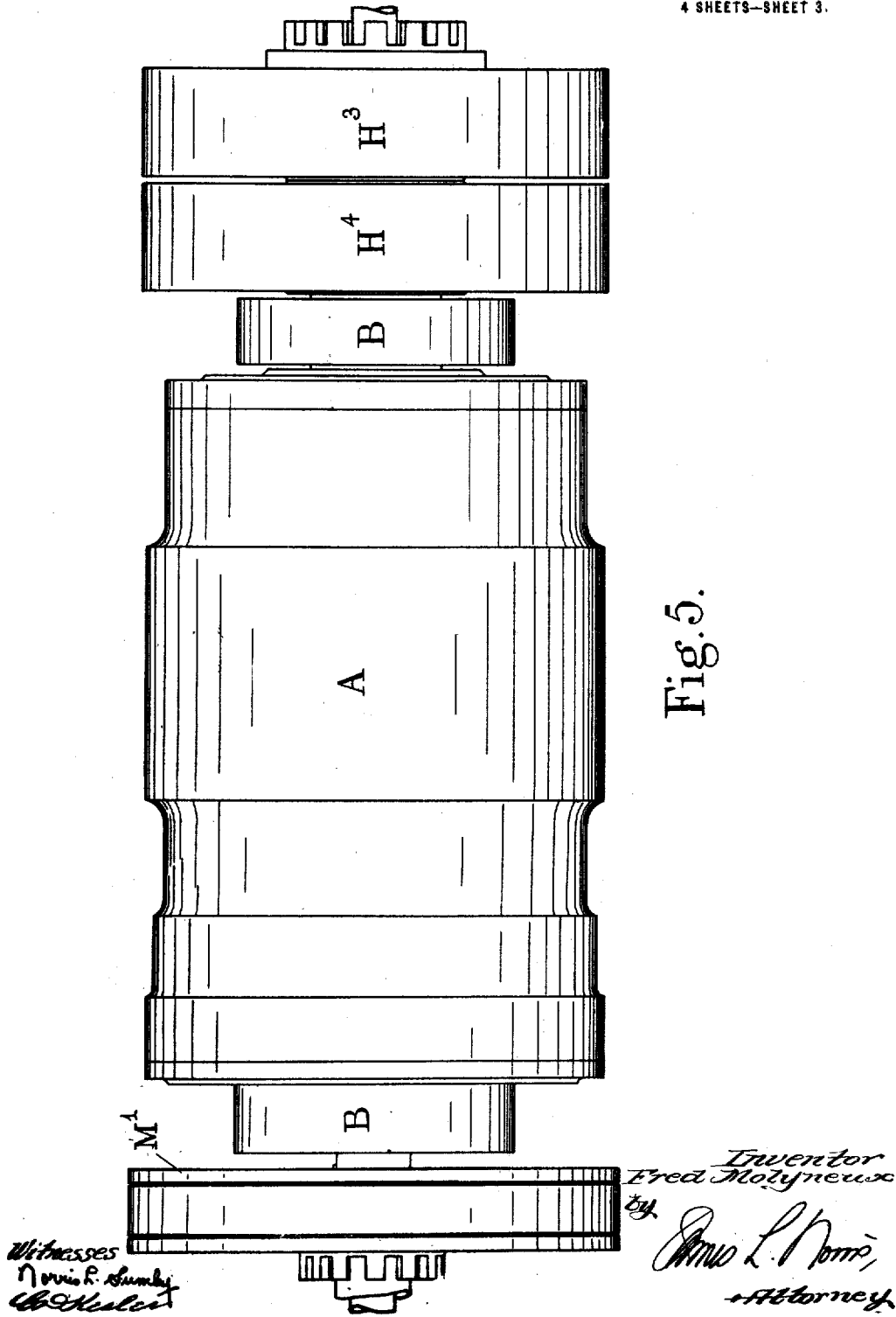

F. MOLYNEUX.
VARIABLE SPEED TRANSMISSION GEAR.
APPLICATION FILED AUG. 6, 1917.

1,353,775.

Patented Sept. 21, 1920.
4 SHEETS—SHEET 4.

UNITED STATES PATENT OFFICE.

FRED MOLYNEUX, OF CADISHEAD, ENGLAND.

VARIABLE-SPEED TRANSMISSION-GEAR.

1,353,775.  Specification of Letters Patent.  Patented Sept. 21, 1920.

Application filed August 6, 1917. Serial No. 184,718.

*To all whom it may concern:*

Be it known that I, FRED MOLYNEUX, a British subject, residing at Cadishead, county of Lancaster, England, have invented certain new and useful Improvements in Variable - Speed Transmission - Gears, of which the following is a specification.

This invention relates to a transmission gear in which the speed ratios between a driving shaft and driven shaft are altered or varied by a train of epicyclic gearing.

It consists essentially in mounting a series of epicyclic trains of gears driven by the driving shaft inside a drum or casing provided with internal teeth with which the planet pinions gear, one train directly driving the driven shaft and the other driving a controller sleeve loose on the driven shaft in the reverse direction on which sleeve is mounted a mechanical or electrical retarding apparatus or brake, by applying which and retarding the rotation of the controller sleeve the ratio of speed between the driving and the driven shafts is varied.

The invention will be fully described with reference to the accompanying drawings in which the invention is shown with a reversing gear but in its simpler form where a forward drive only is required the reversing may be omitted.

Figure 1. is a longitudinal section on line $x$—$x$ Fig. 3.

Fig. 2. is an elevation showing the clutch arrangement.

Fig. 3. is a transverse section on line $z$—$z$ Fig. 1.

Fig. 4. is a longitudinal section showing a modification.

Fig. 5. is an elevation of same.

Fig. 6. is a transverse section.

A cylindrical casing or drum A is mounted to rotate freely in ball or other bearings B and loosely around a driving shaft C at one end and a driven shaft D at the other end.

Referring to Figs. 1 to 3 the drum A is provided with internal teeth $a$ throughout its length with which the planet pinions F to $F^5$ of a series of epicyclic gears mesh.

Upon the end of the driving shaft C, where a forward drive only is required, or upon a sleeve C' connected to a reversing gear but normally rotating in a forward direction with the driving shaft C a carrier E is affixed by a key or otherwise to rotate respectively with the shaft C, or with the sleeve C' whether the latter be rotating forward or reverse.

The carrier E is within the drum A and carries upon studs $e$ the first set of planet pinions F which are in mesh with the internal teeth of the drum. The sun wheel or pinion G around which the pinions F revolve and with which they gear is loose on the central shaft which in this case is the end of the driven shaft D.

The sun wheel G of the first train of epicyclic gears is affixed to or forms part of a second carrier E' which carries upon studs $e$ a second set of planet pinions F' around the sun wheel G', this sun wheel G' being loose on the central shaft.

The sun wheel G' of the second train of epicyclic gears is similarly attached to a third carrier $E^2$ carrying planet pinions $F^2$ around a sun wheel $G^2$ and so on through the succeeding trains $E^3$ $E^4$ and $E^5$ with planet pinions $F^3$ $F^4$ $F^5$ and sun wheels $G^3$ $G^4$ $G^5$.

At the end of the series of epicyclic gears a controller sleeve H is loosely mounted upon the driven shaft D, and upon the controller sleeve H is fitted a magnetic brake H' to retard or arrest the rotation of the sleeve. Instead of the magnetic brake H' a friction brake with a band or shoe may be applied.

A jaw clutch $H^2$, adapted to connect the sleeve H to the shaft D, is also provided for a purpose hereinafter explained.

The carriers E to $E^5$ are preferably in the form of disks but may be bosses with radial arms to carry the planet pinions.

A brake band N may be applied to the drum A if desired, and the friction clutch P permits of the driving shaft C being disconnected to allow of free engine running.

Any number of sets of epicyclic gears with the planet pinions gearing with the internal teeth $a$ of the drum A may be employed six sets being shown as an example in the drawings.

The first carrier E of the series is affixed by key or otherwise to the driving shaft C, or in the example shown to the sleeve C', and rotates with it, and the final carrier of the series with its attached sun pinion ($E^5$ and $G^4$ in the example shown) is affixed by key or otherwise to the driven shaft D so that they rotate together while the final sun pinion ($G^5$ in the example shown) is loose on the shaft D but is attached to the controller sleeve H.

The final set of planet pinions $F^5$ carried by the final carrier $E^5$ gear with the teeth of the drum A and with the final sun pinion $G^5$ attached to the loose sleeve H.

The reversing motion comprises a sleeve C′ loose on the driving shaft C and a second internally toothed drum A′ attached to or forming part of the sleeve C′. Within the drum A′ is a carrier $e'$ for planet pinions $f'$ the carrier being keyed to a sleeve M loose on the shaft C within which the shaft is free to rotate. The sun pinion $g$ with which the planet pinions mesh is keyed to the driving shaft C and rotates with it, the planet pinions being also in mesh with the internal teeth of the drum A′. A brake drum M′ is keyed or otherwise attached to the loose sleeve M, a jaw clutch Q (shown at the left in Fig. 2) being provided for connecting said drum with the shaft C. With the clutch Q engaged, the driving element or sleeve C′ is connected with the shaft C for rotation in unison therewith. When said clutch is disengaged, and the brake tightened on the drum M′, the movement of the sleeve M and pinion carrier $e'$ is arrested, and the drum A′ and sleeve C′ are driven in the reverse direction by the sun pinion $g$ and planet pinions $f'$. It will thus be seen that means are provided for driving the element C′ from the driving shaft C in either direction.

The mechanism for operatively connecting the element C′ with the driven shaft D provides for a wide variation in transmission speed between said parts. Assuming the drum A to be free to rotate: if the sleeve H and sun gear $G^5$ be also free, all of the planet wheels, including the planet wheels $F^5$, will be permitted to rotate idly on their studs $e$, and the carrier $E^5$, and consequently the shaft D, will remain stationary; while if the sleeve H and sun gear $G^5$ be held stationary, the planet wheels $F^5$ will be caused to travel thereabout at a speed determined by that of the driving element C′ and the relative proportions of the several gears, carrying with them the carrier $E^5$, and consequently the shaft D. By so setting the brake H′ as to hold the sleeve H stationary or to permit the same to slip more or less, the shaft D may be driven at any desired speed from zero to maximum. When said shaft has been brought to a speed equal to that of the driving element C′, the clutch $H^2$ may be set, connecting the sleeve H with the shaft D, and the sun gear $G^5$ with the carrier $E^5$, so that the clutch H′ may be released and the strain thereon relieved. Again, assuming the clutches H′ and $H^2$ to be released and the sun gear $G^5$ to be free to rotate; if the drum A be held stationary by the brake band N, the planet gears, including the gears $F^5$, will be caused to travel about the interior of said drum, carrying with them the carrier $E^5$ and consequently the shaft D, causing the latter to be driven at a speed which may be reduced by permitting more or less slipping of said brake band, and thereby providing additional means for varying the driven speed.

Referring to Figs. 4 to 6 the planet wheels $F^6$ and $F^7$, $F^8$ and $F^9$, $F^{10}$ and $F^{11}$ are double or compound the wheels $F^6$, $F^8$ and $F^{10}$ gearing with the sun wheels $G^6$, $G^7$ and $G^8$ and the wheels $F^7$, $F^9$ and $F^{11}$ which are smaller in diameter gearing with the internal teeth $a'$ of the drum or casing A.

The three sun wheels $G^6$, $G^7$ and $G^8$ in this example correspond with the sun wheels G, $G^3$ and $G^4$ previously described, the wheel $G^8$ being keyed to the driven shaft D. So far the apparatus works as previously described with the exception of a greater speed being imparted to the sun wheels by reason of the compound gears $F^6$ to $F^{11}$.

The carriers $E^6$, $E^7$ and $E^8$ for the planet wheels, the two latter being keyed to the sun wheels $G^6$ and $G^7$, correspond with the carriers E, E′ and $E^4$ previously described.

Two carriers $E^9$ and $E^{10}$ are free to revolve around the shaft D being preferably mounted on ball bearings and carry the compound planet wheels $F^{12}$ and $F^{13}$ and the smaller wheel $F^{12}$ meshing with the $F^{14}$ sun wheel $G^9$ which is keyed to the shaft D but not with the casing A, and the second wheel $F^{13}$ meshing with the sun wheel $G^{10}$, the third and largest wheel $F^{14}$ meshing on the one hand with the sun wheel $G^{11}$ and on the other hand with the internal teeth $a'$ of the casing A.

The sun wheel $G^{10}$ is keyed to or forms part of a sleeve $g'$ concentric with the shaft D. To the other end of the sleeve $g'$ is keyed or attached a controller or magnetic or mechanical brake $H^3$.

The sun wheel $G^{11}$ is keyed to or forms part of a second sleeve $g^2$ mounted concentrically over the sleeve $g'$. To the other end of the sleeve $g^2$ a second controller or magnetic or mechanical brake $H^4$ is keyed or attached corresponding with the controller or brake H′ previously described.

The operation of the apparatus up to and including the sun wheel $G^4$ is similar to that previously described, the speed being increased at a greater ratio owing to the smaller planet wheels being rotated by the internal gears of the casing and the sun wheels being rotated by the larger wheels of the compound planet wheels. By retarding or stopping the rotation of the sleeve $g^2$ and the sun wheel $G^{11}$ the motion of the apparatus is transmitted to the driven shaft D in a forward direction and by retarding or stopping the sleeve $g'$ and the sun wheel $G^{10}$ a forward movement is also transmitted to the driven shaft D, but at a slower speed in the ratio of wheel F¹³ to F¹⁴ say about one third or one fourth of the speed of the driving shaft C the controller H⁴ at the same time rotating in the reverse direction.

The apparatus may be applied to motor vehicles and other purposes where a variable speed gear is required.

What I claim as my invention and desire to protect by Letters Patent is:—

1. A variable speed transmission gear comprising in its construction a freely rotating internally toothed drum, a plurality of carriers mounted within said drum, a plurality of epicyclic trains of wheels mounted on the carriers within the internally toothed drum with the teeth of which each set of planet pinions mesh, a driving member or a driving sleeve to which the carrier of the first set of planet wheels is affixed and by which it is driven and a driven shaft co-axial therewith affixed to the final carrier and driven thereby, a controller affixed to the final sun wheel of the train and rotating around the driven shaft in the reverse direction to the drum, and a brake retarding mechanism applied to the controller, whereby when the rotation of the controller is retarded, a through drive is obtained, and as the controller is permitted to rotate, the speed of the driven shaft is reduced substantially as described.

2. In a variable speed transmission gear as in claim 1 the combination with an internally toothed revolving drum and a plurality of sun and planet gears, of a plurality of additional compound planet gears, of a plurality of controllers to which additional sun wheels are attached and compound planet wheels meshing with controlled sun wheels one of which also meshes with the internal gear of the casing to give a slow speed with less frictional resistance substantially as described.

In testimony whereof I have hereunto set my hand in presence of two subscribing witnesses.

FRED MOLYNEUX.

Witnesses:
   I. OWDEN O'BRIEN,
   GEO. H. O'BRIEN.